United States Patent [19]

Talmud et al.

[11] 4,184,455
[45] Jan. 22, 1980

[54] FLUIDIZED BED HEAT EXCHANGER UTILIZING ANGULARLY EXTENDING HEAT EXCHANGE TUBES

[75] Inventors: Fred M. Talmud, Berkeley Heights; Juan-Antonio Garcia-Mallol, Morristown, both of N.J.

[73] Assignee: Foster Wheeler Energy Corporation, Livingston, N.J.

[21] Appl. No.: 895,031

[22] Filed: Apr. 10, 1978

[51] Int. Cl.² .................. F22B 1/02; F23D 19/02
[52] U.S. Cl. .................. 122/4 D; 110/245; 110/263
[58] Field of Search .............. 122/4 D; 110/245, 263; 165/104 F; 34/57 R, 57 A

[56] References Cited

U.S. PATENT DOCUMENTS

| | | | |
|---|---|---|---|
| 3,508,506 | 4/1970 | Bishop | 122/4 |
| 3,696,793 | 10/1972 | Bell | 122/4 |
| 3,729,176 | 4/1973 | Reich et al. | 34/57 |
| 3,930,800 | 1/1976 | Schoener et al. | 165/104 F |

FOREIGN PATENT DOCUMENTS

| | | | |
|---|---|---|---|
| 776791 | 6/1957 | United Kingdom | 122/4 |
| 858813 | 1/1961 | United Kingdom | 122/4 |
| 1307220 | 2/1973 | United Kingdom | 122/4 |
| 309222 | 10/1971 | U.S.S.R. | 122/4 |

Primary Examiner—Kenneth W. Sprague
Attorney, Agent, or Firm—Marvin A. Naigur; John E. Wilson; John J. Hergut, Jr.

[57] ABSTRACT

A fluidized bed heat exchanger in which air is passed through a bed of particulate material containing fuel disposed in a housing. A steam/water natural circulation system is provided and includes a steam drum disposed adjacent the fluidized bed and a series of tubes connected at one end to the steam drum. A portion of the tubes are connected to a water drum and in the path of the air and the gaseous products of combustion exiting from the bed. Another portion of the tubes pass through the bed and extend at an angle to the upper surface of the bed.

9 Claims, 6 Drawing Figures

FLUIDIZED BED HEAT EXCHANGER UTILIZING ANGULARLY EXTENDING HEAT EXCHANGE TUBES

BACKGROUND OF THE INVENTION

This invention relates to a fluidized bed heat exchanger and, more particularly, to such a heat exchanger employing a plurality of heat exchange tubes a portion of each of which are immersed in the fluidized bed.

The use of fluidized beds has long been recognized as an attractive means of generating heat. In these arrangements air is passed through a bed of particulate material which includes a mixture of inert material, a fuel material such as high sulfur, bituminous coal and, usually, adsorbent material for the sulfur released as a result of the combustion of the coal. As a result of the air passing through the bed, the bed is fluidized which promotes the combustion of the fuel. The basic advantages of such an arrangement are many and include a relatively high heat transfer rate, a substantially uniform bed temperature, combustion at relatively low temperatures, ease of handling the fuel materials, a reduction in corrosion and boiler fouling and a reduction in boiler size.

When a fluidized bed of the above type is utilized in a heat exchange environment, such as in a steam generator or boiler, a plurality of heat exchange tubes are normally provided for passing water in a heat exchange relation to the fluidized bed. In most of these arrangements, the tubes are disposed in a serpentine relationship with a great majority of the lengths of the tubes extending horizontally, i.e., parallel to the upper surface of the bed. However, this type of arrangement results in less than optimum operational efficiency since, for example, pumps are required to insure satisfactory circulation of the water and steam through the horizontal portions of the tubes. Also, for a given required heat output it is difficult to maintain an optimum temperature range for the combustion and/or other reaction without either mechanically increasing the cooling fluid velocity or increasing the number of tubes and, of course, the number of penetrations through the bed floor or walls. Also, it has been discovered that in the case of horizontal tubes passing a liquid-vapor mixture in the foregoing manner, irregular cooling of the internal surface of the tube occurs which results in hot spotting and premature failing of the tubes. Further, with the use of horizontally disposed heat exchange tubes it is difficult to control the bed temperature in a linear manner.

SUMMARY OF THE INVENTION

It is therefore an object of the present invention to provide a fluidized bed heat exchanger which, for a given heat output, uses a minimum of heat exchange tubes for maintaining an optimum temperature range for the combustion process.

It is a further object of the present invention to provide a heat exchanger of the above type in which a smaller number of tubes and number of penetrations through the bed floor or walls is required when compared to that of a standard vertical tube heat exchanger for a given heat output.

It is a still further object of the present invention to provide a heat exchanger of the above type in which a uniform cooling of the internal surfaces of the tubes is achieved to prevent hot spotting and premature failing of the tubes.

It is a further object of the present invention to provide a heat exchanger of the above type which eliminates the need for circulation pumps and the necessity to mechanically increase the cooling fluid velocity to obtain a given heat output for a selected number of tubes.

Toward the fulfillment of these and other objects the system of the present invention comprises a heat exchanger in which at least one bed of particulate material containing fuel is established in a housing and air is passed through the bed to fluidize the material and promote the combustion of the fuel. A series of tubes are provided which are connected at one end to the steam drum and which pass through the fluidized bed. The immersed tube portions extend at an angle to the upper surface of the bed and are connected at their other ends to the steam drum for permitting water to pass from the steam drum through the bed and back to the steam drum to transfer heat from the fluidized bed to the water.

BRIEF DESCRIPTION OF THE DRAWINGS

The above description, as well as further objects, features, and advantages of the present invention, will be more fully appreciated by reference to the following description of a presently-preferred but nonetheless illustrative embodiment in accordance with the present invention, when taken in connection with the accompanying drawings wherein.

DESCRIPTION OF THE PREFERRED EMBODIMENTS

Figure 1:
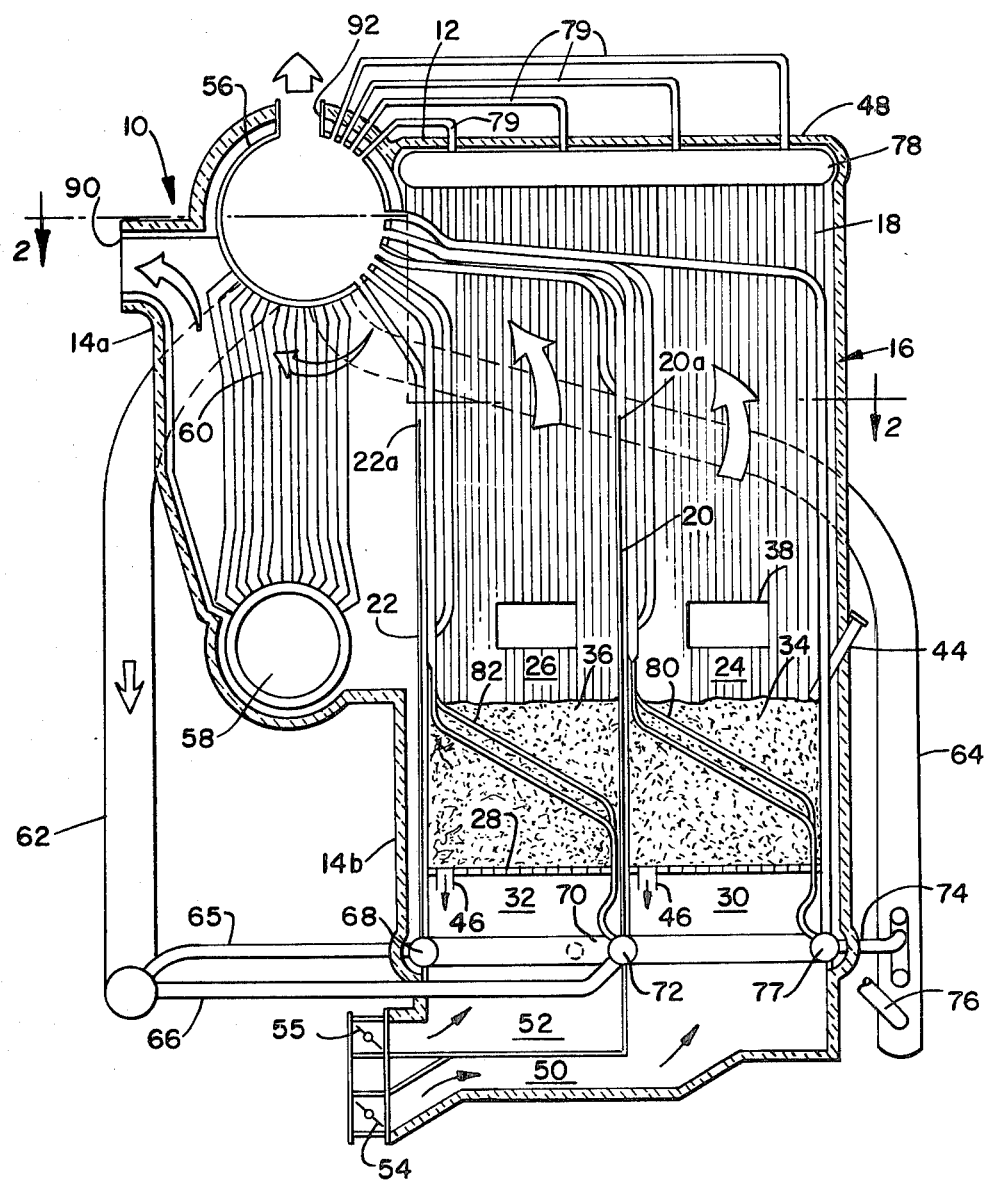
FIG. 1 is a schematic cross-sectional view of the heat exchanger of the present invention.

Referring specifically to FIG. 1 of the drawings the reference numeral 10 refers in general to the fluidized bed heat exchanger of the present invention which, for the purposes of example, is shown in the form of a steam generator. The generator includes an outer vessel having a top wall or roof 12, an upper front wall 14a, a lower front wall 14b, a rear wall 16, and two sidewalls, one of which is shown by the reference numeral 18.

A pair of spaced partition walls 20 and 22 extend parallel to the rear wall 16 and between the sidewalls 18 and define chambers 24 and 26. A horizontally extending air distribution plate 28 extends between the partition wall 22 and the rear wall 16, between the two sidewalls 18 near the lower portion of each chamber 24 and 26, and in a spaced relation to the floor of the vessel to define air distribution chambers 30 and 32 respectively. Two beds of particulate material, shown in general by the reference numerals 34 and 36, are disposed in the chambers 24 and 26, respectively and are supported by the plate 28. Each bed of particulate material includes a mixture of crushed coal and an inert material such as commercial grade hematite iron ore. Also, a fine limestone or dolomite can be included for use as an adsorbent for the sulfur released during the combustion of the fuel, in a conventional manner.

Figure 2:
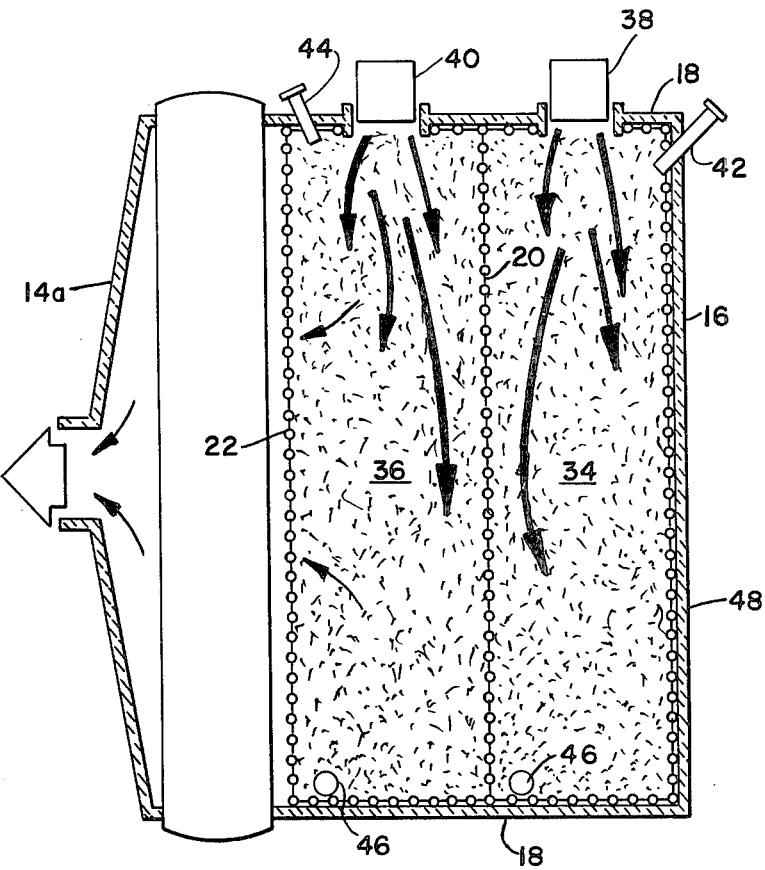
FIG. 2 is a schematic horizontal cross-sectional view of the heat exchanger of the present invention taken along the line 2—2 of FIG. 1.

As better shown in FIG. 2, two spreader coal feeders 38 and 40 are mounted to one sidewall 18 for introducing the fuel and limestone mixture into the beds 34 and 36, respectively, while a limestone feed pipe 42 is mounted in the wall 16 for introducing the limestone into the bed 34 and a limestone feed pipe 44 is mounted through the latter sidewall 18 for introducing limestone into the bed 36. A drain 46 is provided for each of the beds 34 and 36 and extends through the plate 28 for permitting the spent particulate material to discharge from the bed as will described in detail later.

As also shown with reference to FIG. 2, each of the walls 16, 18, 20, and 22 are formed by a plurality of tubes having two longitudinally extending fins connected to diametrically opposite portions thereof with the fins of adjacent tubes being welded together to form a gas-tight structure. Further, an outer layer of insulating material 48 extends around and encloses the tubular rear wall 16 and the sidewalls 18 and also forms the roof 12 and the upper and lower front walls 14a and 14b of the vessel.

Referring again to FIG. 1, two air distribution ducts 50 and 52 are disposed immediately below the air distribution chambers 30 and 32, respectively, for distributing air to the latter chambers and into the beds 34 and 36, respectively. The air flows through the ducts 50 and 52 under the control of dampers 54 and 55, respectively, located in the ducts and then upwardly through the chambers 30 and 32 and the plate 28 to fluidize the beds 34 and 36 and promote the combustion of the particulate fuel material. The air, after passing through the beds 34 and 36 and taking part in the combustion reactions combines with the gaseous products of combustion and exits outwardly from the chambers 24 and 26, respectively, in a manner to be described in detail later.

A water/steam circulation system is provided between the partition wall 22 and the upper front wall 14a and includes an upper steam drum 56 and a lower water, or mud, drum 58. A boiler bank 60 is also provided and consists of a multiplicity of spaced tubes connecting the steam drum 56 and the water drum 58 to place them in fluid communication. The steam drum 56 is supported by external support structure (not shown) and the water drum 58 is supported by the steam drum through the boiler bank 60.

Two pairs of downcomers 62 and 64 extend downwardly from the steam drum, with one downcomer of each pair being shown in FIG. 1. The downcomer 62 is connected to a series of horizontal feed pipes 65 and 66 located at the lower portion of the vessel with one feed pipe of each series being shown in FIG. 1. The feed pipes 65 are connected in fluid communication with a horizontal header 68 and a horizontal header 70 which, in turn, are connected in fluid communication with the lower ends of the tubes forming the partition wall 22 and one of the sidewalls 18, respectively. In a similar manner, the feed pipes 66 are connected to a horizontal header 72 which is connected in flow communication with the lower ends of the tubes forming the partition wall 20. The downcomers 64 are connected to a series of feed pipes 74 and 76, one of each of which are shown in FIG. 1, with the feed pipes 74 being connected in fluid communication with a header 77 which, in turn, is connected to the lower ends of the tubes forming the rear wall 16. Although not clear from the drawings it is understood that the feed pipes 76 are connected to a header (not shown) which is in fluid communication with the lower ends of the tubes forming the rear sidewall 18.

An upper header 78, located adjacent the roof 12 is connected to the upper ends of the tubes forming the sidewall 18 shown in FIG. 1 for receiving the fluid from the latter. A plurality of riser tubes 79 are connected between the header 78 and the steam drum 56 for passing the fluid back to the steam drum. It is understood that another header similar to header 78 is provided in connection with the tubes forming the other sidewall 18 and is connected, via additional tubes, to the steam drum 56.

Referring again to FIG. 1, the upper portions of the tubes forming the walls 16, 20, and 22 are bent into a horizontal configuration as shown and are connected to the steam drum 56 to complete the flow circuit. In this respect it is noted that the finned portions of the tubes forming the walls 20 and 22 terminate at points shown by the reference numerals 20a and 22a, respectively but that the tubes forming these walls continue upwardly and are bent over as shown for connection to the steam drum 56. As a result, the air and gaseous products of combustion from the beds 34 and 36 can pass through the spaces thus defined between the upper portions of the tubes forming the walls 20 and 22, as they exit from the chambers 24 and 26, respectively, as will be described in detail later.

An additional circuit for the passage of the water and steam is provided by two series of bed tubes 80 and 82 which are connected at their lower ends to the headers 77 and 72, respectively, and which pass upwardly in a substantially vertical manner through the air distribution chambers 30 and 32, and into the lower portions of the beds 34 and 36, respectively. The bed tubes 80 and 82 are then bent at an angle to the upper surface of the beds 34 and 36, respectively, and extend diagonally across the beds whereby they are bent again to extend vertically upwardly through the remaining portions of the chambers 24 and 26, respectively, before they are bent again into a substantially horizontal configuration for connection to the steam drum 56.

A gas outlet 90 is provided in the upper front wall 14a for the discharge of the air and gaseous products of combustion from the chambers 24 and 26. In passing from the latter chambers the air and gaseous products of combustion pass over the boiler bank 60 to add heat to the water/steam in the tubes forming the boiler bank as will be described in detail later. A steam outlet 92 is provided in the steam drum 56 for providing for the discharge of the steam to another unit, such as a steam turbine, or the like.

In operation, the particulate fuel material in the beds 34 and 36 is ignited by ignitors, or the like (not shown) disposed in the beds and preferably in an ignition zone at the ends of the beds, in a conventional manner. Air is passed through the air ducts 50 and 52 under control of the dampers 54 and 55 into the air distribution chambers 30 and 32, respectively, for passage upwardly through the plate 28 and into the beds 34 and 36, respectively. This fluidizes the particulate bed material and promotes the combustion of the fuel material, after which the excess air combines with the gaseous products of the combustion of the fuel material and flows upwardly into the upper portions of the chambers 24 and 26 before exiting from the chambers and passing across the boiler bank 60 before discharging through the vessel via the outlet 90.

Water is circulated from the steam drum 56 through the boiler bank 60 and into the water drum 58 and, from the downcomers 62 and 64 to the bed tubes 80 and 82 and the tubes forming the walls 16, 18, 20, and 22, as described previously. The hot air and gases passing over the boiler bank 60 add heat to the water passing through the tubes of the latter, to convert a portion of it to steam with the water/steam mixture rising in the tubes by natural convection and passing back into the steam drum 56. It is understood that the steam drum 56 may be provided with separators to separate the steam from the water in a conventional manner before the steam exits from the steam outlet 92. The heat generated by the fluidized beds 34 and 36 also adds heat to the water flowing through the tube banks 80 and 82 disposed in the chambers 24 and 26 and particularly those portions thereof immersed in the fluidized beds 34 and 36. The portion of the water that is not converted to steam will recirculate in the foregoing manner and additional feedwater is supplied to the drum 56 through an inlet (not shown) to replenish the water that is converted to steam.

FIGS. 3-6 depict alternate embodiments of the particular arrangement of the bed tubes and their relation to the fluidized beds. These alternate embodiments will be described in connection with the fluidized bed 34 and its associated bed tubes, and other components that are identical to the components in the previous embodiment are referred to by the same reference numerals.

Figure 3:
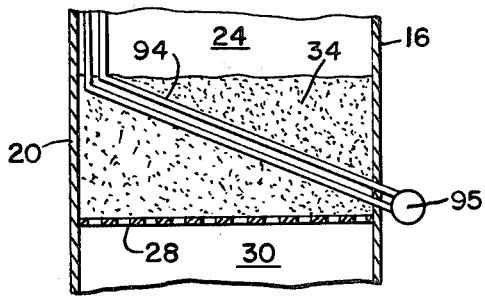
FIGS. 3–6 are partial views of a portion of the componentry of FIG. 1 showing alternate arrangements of the immersed portions of the tubes.

In the embodiment of FIG. 3, a series of bed tubes 94 is provided which extend from a header 95 disposed externally of the vessel and adjacent the rear wall 16. The tubes 94 extend through the wall 16 and diagonally through the bed 34 before bending upwardly into a vertical direction as shown. Otherwise this embodiment is identical to that of the previous embodiment.

Figure 4:
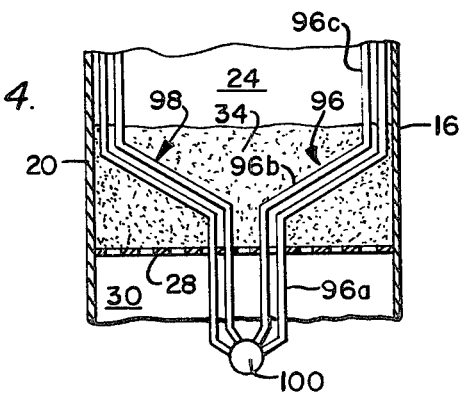

In the embodiment of FIG. 4 two series of bed tubes 96 and 98 are provided and extend in a substantially "Y" configuration with the lower ends of both series of tubes being connected to a common lower header 100. The bed tubes 96 include outwardly slanted portions 96b extending through the bed 34 and vertical portions 96c which extend through the remaining portion of the chamber 24 before bending across to the steam drum 56. The tubes 98 are arranged in a similar manner and therefore are not described in any further detail.

Figure 5:
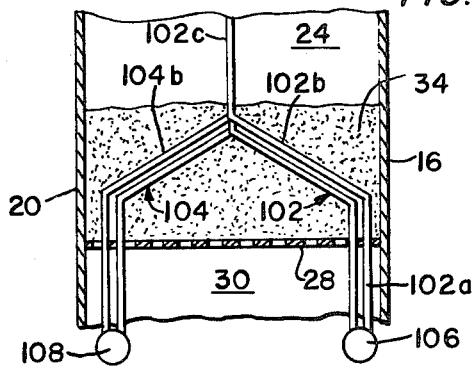

According to the embodiment of FIG. 5, a first and second series of bed tubes 102 and 104, respectively, are provided in the fluidized bed 34 and are configured to form an inverted Y as shown. Each bed tube 102 includes a vertical portion 102a connected to a header 106 disposed below the plate 28, a portion 102b extending through the fluidized bed and slanted inwardly towards the center of the bed, and an upper portion 102c extending vertically through the remaining portion of the chamber 24 and bending across for connection to the steam drum 56. The tubes 104 may be configured in a similar manner with the exception that the lower portions of these tubes are connected to a header 108.

Figure 6:
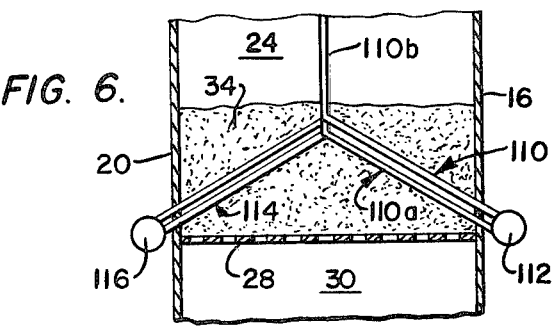

In the embodiment of FIG. 6 a first series of bed tubes 110 have slanted portions 110a extending from a header 112 disposed externally of the vessel and adjacent the wall 16 and through the latter wall and the bed 34. The tubes 110 have vertical portions 110b which extend from the upper portion of the bed 34 and through the upper chamber 24 before they are bent for connection to the steam drum 56. Another series of bed tubes 114 are connected to a header 116 disposed adjacent the wall 20 and are configured in a manner similar to the tubes 110.

It is understood that in each of the embodiments of FIGS. 3-6, another bed, similar to bed 36 of the first embodiment, can be provided adjacent the bed 34 and can contain bed tubes that are identical to the beds tubes described above in connection with bed 34.

The advantages of the foregoing arrangement are numerous. For example, the disposition of the slanted portions of the bed tubes 80 and 82 in the fluidized beds 34 and 36 increases the efficiency of the steam generator to the extent that a relatively high heat output can be attained without mechanically increasing the cooling fluid velocity. Also only a relatively small number of tubes is required to attain a given heat output thus reducing the tube surface outside the bed and the number of penetrations through the bed floor. Also, due to the upflow of the fluid inside the slanted portions of the bed tubes, the fluid becomes lighter with increases in temperature and the resulting distribution of steam and water in the tubes promotes a uniform moistening of the inner wall of tubes thus preventing hot spotting and premature tube failure. Further, the bed temperature can be controlled in a linear fashion by simply modifying the bed height to change the amount of cooling surfaces. Still further, circulation pumps to pass the fluid through the bed tubes are not required due to the natural circulation resulting from the slanted tube arrangement.

It is also understood that the present invention has been described in connection with a steam generator only for the purposes of example and can be used in other applications consistent with the foregoing.

Other latitudes of modification, change and substitution are intended in the foregoing disclosure and in some instances some features of the invention will be employed without a corresponding use of other features. Accordingly, it is appropriate that the appended claims be construed broadly and in a manner consistent with the spirit and scope of the invention herein.

What is claimed is:

1. A heat exchanger comprising a housing, means defining a chamber in said housing, means for establishing at least one bed of particulate material containing fuel in the lower portion of said chamber, means for passing air through said bed to fluidize said material and promote the combination of said fuel, said air combining with the gaseous products of combustion of said fuel and passing through the upper portion of said chamber, a steam drum, a series of tubes connected at one end to said steam drum, a portion of each of said tubes extending through said lower and upper chamber portions, the tube portions extending through said lower chamber portion being immersed in said bed with at least a portion thereof extending at an acute angle to the upper surface of said bed, the tube portions extending through said upper chamber portion extending vertically, and means connecting said steam drum to the other end of said tubes for permitting water to pass from said steam drum, through said tube portions, and back to said steam drum to transfer heat from said fluidized bed and said air and gaseous products of combustion to said water.

2. The heat exchanger of claim 1, further comprising a bank of additional tubes disposed adjacent said chamber and connected to said steam drum, and means for directing said air and gaseous products of combustion from said chamber over said bank of additional tubes to add heat to the water circulating through said additional tubes.

3. The heat exchanger of claim 2, further comprising a water drum connected to said bank of additional tubes for permitting said water to circulate through said latter tubes and between said steam drum and said water drum.

4. The heat exchanger of claim 3, wherein a portion of the water from said steam drum circulates through said first series of tubes and back to said steam drum and wherein a portion of the water from said steam drum circulates through said bank of additional tubes, through said water drum and back to said steam drum.

5. The heat exchanger of claim 1, wherein said angularly extending tube portions extend diagonally across said bed.

6. The heat exchanger of claim 1, wherein said angularly extending immersed tube portions extend from opposite sides of said beds towards the center of said beds.

7. The heat exchanger of claim 1, wherein said immersed tube portions extend vertically upwardly in the lower portion of said bed and angularly in the upper portion of said bed.

8. The heat exchanger of claim 7, wherein said vertically extending immersed tube portions extend along the center of said bed and wherein said angularly extending immersed tube portions extend outwardly from said vertically extending immersed tube portions in opposite directions.

9. The heat exchanger of claim 7, wherein said vertically extending immersed tube portions are located adjacent opposite sides of said bed and wherein said angularly extending immersed tube portions extend inwardly from said vertically extending immersed tube portions towards the center of said bed.

* * * * *